United States Patent
Reinhart

[11] 3,905,588
[45] Sept. 16, 1975

[54] METHOD AND APPARATUS FOR PLASTICATING POLYMERS

[75] Inventor: Lawrence Walter Reinhart, Loveland, Ohio

[73] Assignee: Cincinnati Milacron Inc., Cincinnati, Ohio

[22] Filed: Feb. 8, 1974

[21] Appl. No.: 440,694

[52] U.S. Cl. .................................. 259/191; 259/10
[51] Int. Cl.² ............................................ B29B 1/10
[58] Field of Search ............ 259/191, 193, 194, 192, 259/9, 10, 25, 26, 45, 46, 97, 109, 110, 5, DIG. 1, DIG. 11; 416/176; 415/72; 425/207, 208, 209

[56] References Cited
UNITED STATES PATENTS

| | | | |
|---|---|---|---|
| 2,972,168 | 2/1961 | Pastorello | 425/209 |
| 3,263,276 | 8/1966 | Maier | 425/208 |
| 3,295,160 | 1/1967 | Schippers | 425/208 |
| 3,317,959 | 5/1967 | List | 259/191 |
| 3,727,892 | 4/1973 | Notte et al. | 259/10 |
| 3,826,477 | 7/1974 | Kunogi et al. | 259/191 |

Primary Examiner—Harvey C. Hornsby
Assistant Examiner—James A. Niegowski
Attorney, Agent, or Firm—Daniel P. Worth

[57] ABSTRACT

A method and apparatus for plasticating highly crystalline polymers include a screw with a core and constant pitch thread with a thread outside diameter profile presenting or having a necked down or least diameter portion in its compression or central section and which when rotated within a constant diameter barrel provides a varying clearance between the screw and barrel whereby melt quality is improved and screw wear is reduced when such a polymer (for example: polypropylene and high density polyethylene) is passed therethrough.

5 Claims, 2 Drawing Figures

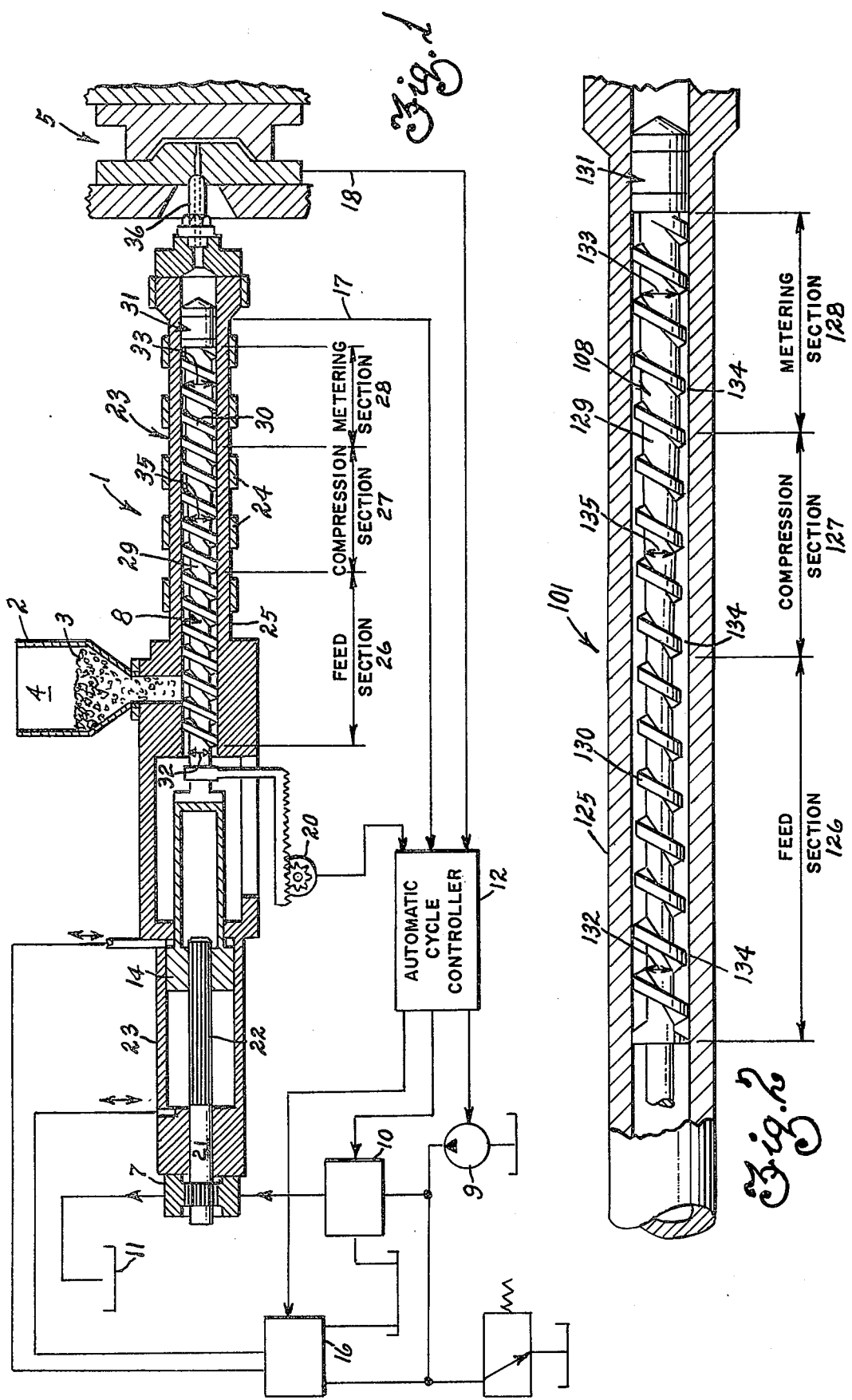

METHOD AND APPARATUS FOR PLASTICATING POLYMERS

SUMMARY AND BACKGROUND

This invention relates to an improved method and apparatus for plasticating polymers. One aspect relates to a method of plasticating highly crystalline polymers by passing same through a single screw type plasticator having a varying clearance between the screw and barrel. An aspect relates to an improved screw having an hourglass outside diameter profile. An aspect of the apparatus is to provide a single screw plasticator with such a screw mounted for rotation within a barrel having a substantially constant inside diameter.

Processing highly crystalline thermoplastic aliphatic polymers such as polypropylene and high density polyethylene (specific gravity equal or greater than 0.95) in a single screw plasticator generates a number of problems peculiar to these materials. For one thing the plastication is ordinarily accomplished by passing solid pellets of the polymer through a screw rotating within a heated barrel whereby mechanical and thermal energy are added to the plastic and change it from pelletized solid to a viscous fluid. One of the problems in handling these materials is to plasticate the materials thoroughly and eliminate solid particles (unmelt) therein. Unfortunately these particular crystalline polymers do frequently provide melts of poor quality having a lot of solid particles in them, resulting in poor injection molding, extrusion, or what have you. Screw wear in the single screw plasticators is also generally extreme and is characterized by wearing down the middle section of the screw by the flaking off of metal particles or the actual formation of flanges of metal on the thread of the screw, the flanges being derived by metal being forced back from its original position to form a sort of flange on the trailing edge of the screw thread. On occasion screws worn in this fashion have actually produced higher quality melt than screws that have a straight or regular thread.

The present invention proposes to reduce the outside diameter of the screw in an area located between the ends of the thread or flight profile. This diametral change improves the quality of the melt and improves the overall quality of moldings produced from high density polyolefins.

In the prior art a typical screw for a single screw plasticator such as found in extrusion machines for making pipe or film or for plasticating materials prior to injection molding ordinarily has a substantially constant outside thread (or flight) diameter and is divided into three sections along its length. The first section is a feed section for receiving pelletized solid plastic and having a small but substantially constant core diameter. Next in line is the compression section which receives material from the feed section and has an increasing core diameter. The third section is called a metering section and is on the extreme downstream end of the screw and is characterized by having a constant core diameter which is larger than the diameter of the feed section core screw upstream. The entire screw is mounted within a heated barrel of substantially constant inside diameter which provides a substantially constant diametral clearance between the barrel and the screw flight.

Attempts to solve some of the problems of plasticating highly crystalline polymers in the past have involved various combinations of increasing the thermal energy added, using multiple flights on the screw, interrupting the screw threads, putting threads on the inside of the barrel or using certain combinations of compression ratio or length to diameter ratios. Many of these techniques are summarized in the Oct. 1972 issue of *Plastics Technology*, pages 67 et. seq. (Vol. 18 No. 10). Another very illustrative work showing a large number of screw shapes and designs as well as giving the theories thereof is "Plastics Extrusion Technology and Theory" by Gerhard Schenkel published in U.S. by American Elsevier Publishing Co., New York, NY Library of Congress Catalogue Card No. 66–17240.

The present invention, as already noted, distinguishes from the general characteristics of the prior art single screw plasticators in providing a varying clearance preferably by providing a screw having the minimum outside diameter in a generally central region preferably in the compression section, which diameter increases gradually to that of the screw threads on the extreme ends of the screw where preferably the diameters are substantially equal. Advantages in features of the instant construction permit easy replacement of a worn or ineffective (with high density polymers) screw, an improved melt quality, and minimum alterations to the machine cycle of operation which is especially important in the case of injection molding equipment.

Objects of the invention to provide an improved screw, an improved combination of barrel and screw, and/or an improved plasticating method.

Other objects, advantages and features will become apparent from the following specification when read in conjunction with the annexed drawings wherein:

FIG. 1 schematically illustrates a typical prior art injection molding machine in connection with which the invention will without prejudice be described by way of example but not limitation, such machine having a single screw plasticator with a heated barrel and screw, omitting details of injection molding machines not pertinent to the instant invention; and FIG. 2 shows (in a different and smaller scale than FIG. 1) a screw according to the present invention combined with the barrel of the FIG. 1 extruder.

The drawings are not to scale.

FIG. 1 illustrates an injection molding machine 1 having a plasticating means 2 which receives solid pelletized highly crystalline polymers 3 in its feed hopper 4, plasticates same thereby changing it to a melt consisting of a highly viscous liquid which is then injected into a mold 5.

A plasticating means 2 includes a hydraulic motor 7 for rotating the screw 8 powered by pressurized hydraulic liquid received from the pump 9 by means of a hydraulic control valve 10. The motor exhausts its hydraulic liquid to a sump 11. A cycle controller 12 directs hydraulic fluid from the pump 9 to the motor and to the screw piston 14 by appropriately manipulating the motor control valve 10 and piston control valve 16 in fashions well known to the prior art. Preferably the cycle controller adjusts the cycle in response to process conditions such as melt temperature 17, mold pressure 18 or injection velocity as indicated by electric tachometer 20 also as known to the art. Other control parameters can be used those shown being by way of example not limitation; e.g., screw position can be used by having a position transducer (a potentiometer) 20 instead of a velocity measurement.

A drive shaft 21 connected to the motor has a splined section 22 on which is mounted the hydraulic piston 14 that in turn slides within a hydraulic cylinder 23 that receives hydraulic fluid by way of the control valve 16 and operates in a double acting fashion in order to advance or retract the screw. The piston 14 is connected to the splined section 22 by an internal splined section. The screw is directly connected to one end of the piston. It will be observed that the drive shaft, splined connection, piston, and screw provide a dual power train for rotating the screw 8 within the heated (with electric heaters 24) barrel 25 as well as for advancing and retracting same whereby the screw can reciprocate in the barrel to inject plastic and during plastication as is well known in the art.

The screw of FIG. 1 has a conventional prior art construction consisting of feed, compression and metering sections 26, 27, 28 arranged in series along the screw. A core 29 provides a support for the thread 30 which thread has a constant outside diameter and the barrel 25 in which it rotates likewise has a constant inside diameter and there is a substantially constant clearance between the thread outside diameter and barrel inside diameter. The screw is integral, that is made from one piece of material. At the end of the screw is a tip assembly 31 which preferably has some sort of valve means in it to control back flow during injection strokes.

As illustrated in FIG. 1, and also as well known in the prior art, including the publications mentioned above, the feed section and metering section both have constant core diameters 32, 33 with the metering section having the larger core diameter. In the compression section the core diameter 35 increases as the structure proceeds from the feed to the metering section.

At the extreme end of the barrel is a nozzle 36 which is used as is well known to effectuate a passage of plasticated material from the barrel into the mold.

In FIG. 2 is shown a barrel 125 (the barrel of FIG. 1 with the other details of FIG. 1 being understood as needed) containing a screw 108 constructed in accordance with the present invention. The screw is integral or made from one piece of material and is adapted for plasticating highly crystalline polymers. It may be flame hardened on the outside of the thread. The barrel, as explained above in connection with FIG. 1, has a substantially constant inside diameter and thereby provides a varying clearance 134 (meaning the space between the thread outside diameter and barrel inside diameter) that increases as the structure progresses from the feed to the central part of the compression section and thereafter decreases. The thread outside diameter is preferably the same at the extreme ends of the feed and metering section; i.e., at the terminal thread helices whereby inserting the screw into a barrel is facilitated and also provides bearing surfaces at the extreme ends of the screw.

The extruder screw 108 of FIG. 2 has a core 129 with a thread 130 of preferably constant pitch that defines the feed compression and metering sections 126, 127, 128 as already stated. The core diameters 132, 133, 135 vary in the manner described in connection with FIG. 1; i.e., it is larger in the metering than in the feed section and increases as the screw core progresses through the compression section from the feed to the metering section. The screw 108 further comprises a thread having a varying outside diameter with such diameter being least in the compression section and with the greatest outside diameters preferably being substantially equal and at the terminal ends of the thread in the feed and compression section whereby the thread has an hourglass outside diameter profile.

In its preferred embodiment, the thread 130 has a constant pitch, is used in a barrel 125 having a substantially constant inside diameter and is made of one piece of material; i.e., in integral fashion.

The invention also embraces a combination of barrel and screw for plasticating highly crystalline polymers 3 where the structure comprises a varying radial or diametral clearance between the barrel and the outside diameter of the thread on the screw, the clearance being a maximum in a radial plane passing through the compression section and being at a minimum in respective radial planes at approximately where the thread terminates adjacent the opposite ends of the screw. At least one complete turn of the thread at each end is preferred for this maximum outside diameter to provide suitable bearing coaction between the thread and barrel.

The invention also embraces a method of plasticating highly crystalline polymers 3 such as polypropylene, or high density polyethylene (specific gravity equal to or greater than 0.95), mixtures thereof and copolymers thereof, or like materials by providing an apparatus 101 that includes a barrel in which is supported for rotation relative thereto a screw 108 having a core 129 and thread 130 that have in the order named, feed, compression and metering section. The method further includes the steps of feeding into the apparatus adjacent the screw feed section — as by means of the hopper — at least one solid polymer of the class described, relatively rotating the said screw and said barrel by means of the hydraulic motor — in the present embodiment the screw is turned within the barrel — and as the material is plasticated it builds up between the screw tip assembly 31 or 131 (which preferably is a ball-check valve tip although a sleeve check valve tip may be used) and the nozzle and forces the screw to the rear until a volume of material ahead of the screw is great enough to make up a shot for injection molding. The method further includes forcing in response to the relative rotation the polymer to pass through a passageway along the screw comprising varying radial clearance 134 between said thread on said screw and said barrel with the maximum such clearance being within the compression section 127 and the minimum such clearances being at the ends 126, 128 of the feed and metering sections and thereafter removing plasticated polymer through an opening such as the nozzle at the end of the barrel adjacent to the end of the screw metering section.

Use of a screw manufactured to the described hourglass shape yields a reduced number of faulty moldings because the melt quality is higher. Increased extruder RPM is not apparently required in order to maintain the throughput required for production purposes. The overall results from a production standpoint are that fewer rejected parts per unit of time are molded.

The invention claimed is:

1. An extruder screw having a core and a thread thereon defining a feed section, compression section, and metering section wherein the core diameter is larger in the metering section than in the feed section and increases as the screw progresses through the compression section from the feed to the metering section that further comprises a thread having a varying outside diameter with the least such outside diameter being in the compression section and with its greatest outside diameters being substantially equal and at the ends of the thread in the feed and compression sections, whereby the thread has an hourglass outside diameter profile.

2. An extruder screw according to claim 1 wherein said thread has a constant pitch.

3. A single stage screw according to claim 1 that is integral or made from one piece of material adapted for plasticating highly crystalline polymers wherein the flight is flame hardened.

4. An extruder screw for a single screw extruder according to claim 1, combined with a barrel of substantially constant inside diameter in which said screw is rotatably mounted.

5. The combination in a single screw extruder for plasticating highly crystalline polymers of a barrel having a substantially constant inside diameter and threaded screw having feed, compression and metering sections the diameter of the core of which increases as the screw progresses through the compression from the feed to the metering section and which is supported within said barrel for rotation relative thereto, which combination further comprises:

said thread having a varying outside diameter with the least such outside diameter being in the compression section and with its greatest outside diameters being substantially equal and at the end flights of the thread in the feed and metering sections, whereby the thread has an hourglass outside diameter profile and the combination is provided with a varying radial clearance between the inside diameter of the barrel and the thread on said screw with the greatest such clearance between the screw compression section and the adjacent portion of said barrel.

* * * * *